United States Patent
Couzy et al.

(10) Patent No.: US 6,551,633 B2
(45) Date of Patent: *Apr. 22, 2003

(54) MILK-BASED POWDER FOR PETS

(75) Inventors: Francois Couzy, La Croix sur Lutry (CH); Jean-Louis Leuba, deceased, late of Boussens (CH), by Christine Leuba, Frederic Leuba, Aurelie Leuba, legal representatives

(73) Assignee: Nestec S.A., Vevey (CH)

(*) Notice: Subject to any disclaimer, the term of this patent is extended or adjusted under 35 U.S.C. 154(b) by 0 days.

This patent is subject to a terminal disclaimer.

(21) Appl. No.: 10/210,909

(22) Filed: Aug. 2, 2002

(65) Prior Publication Data

US 2002/0192347 A1 Dec. 19, 2002

Related U.S. Application Data

(63) Continuation-in-part of application No. 09/801,264, filed on Mar. 7, 2001, now Pat. No. 6,471,999, which is a continuation of application No. PCT/EP99/06621, filed on Sep. 7, 1999.
(60) Provisional application No. 60/099,383, filed on Sep. 8, 1998.

(51) Int. Cl.$^7$ .................... A23K 1/165; A23K 1/18
(52) U.S. Cl. .................... 426/2; 426/61; 426/588; 426/805
(58) Field of Search .................... 426/2, 61, 588, 426/805

(56) References Cited

U.S. PATENT DOCUMENTS

| | | | |
|---|---|---|---|
| 2,781,266 A | 2/1957 | Stimpson | 99/9 |
| 4,007,283 A | 2/1977 | Crisan et al. | 426/34 |
| 4,401,657 A | * 8/1983 | Kashiwabara et al. | 424/177 |
| 4,944,952 A | 7/1990 | Kobayashi et al. | 426/42 |
| 5,141,755 A | 8/1992 | Weisman | 426/42 |

FOREIGN PATENT DOCUMENTS

| | | |
|---|---|---|
| EP | 0323201 | 12/1987 |
| EP | 0458358 | 11/1991 |
| JP | 58201949 | 11/1983 |

OTHER PUBLICATIONS

Rao et al. "Enzyme Technologies For Alleviating Lactose Maldigestion" Food & Science Tech. Int'l, vol. 3, No. 2, p. 82–85 (1997).
V. H. Holsinger et al., "Applications of Lactase in Dairy Foods and Other Foods Containing Lactose", Food & Science Tech. Int'l, vol. 3, No. 2, p. 81–86 (1997).
"Digestibility and Palatability", http:/www.speedyvet.com. pp. 1–5 (2001).
"Feeding Cats", http:/www.fabcats.org. pp. 1–8(1997–2002).
R. Tilson et al., "Management & Conservation of Captive Tigers", (eds) 2nd, Minnesota Zoo, pp. 1–136 (1994).
Dierenfeld et al, "Mammal Nutrition", http:/www.zog%20 frames/Mamal%20 Nutrition/MamalNutrition.htm, pp. 1–5 (1997).
Pet Owners—"A Dog Owner's Handbook", http:/www.ovma.org/pets/dog_handbook.shtml. pp. 1–13 (2001).
Pet Owners—"A CatOwner's Handbook", http:/www.ovma.org/pets/cat_handbook.shtml. pp. 1–12, (2001).
K–State Veterinarian helps owners separate facts from fiction, http:/www.mediarel;ations.ksu.edu., pp. 1–12 (1997).
Feline Life stages/Lifestyles, The Waltham Course on Dog and Cat Nutrition, pp. 1–20 (1999).
W.L. Hurley, "Milk Composition", Lactation Biology Course offered by Univ. of Ill, http://classes.aces,uiuc.edu, p. 1–11.
The Lactose Zoo, , http://ourworld.compuserve.com/homepages/stevecarper/zoo.htm pp. 1–3.

* cited by examiner

*Primary Examiner*—Chhaya D. Sayala
(74) *Attorney, Agent, or Firm*—Winston & Strawn

(57) ABSTRACT

A pet milk powder of a cow's milk powder which contains lactose, and lactase in an amount sufficient to reduce the symptoms of gastrointestinal intolerance in pets when the powder or a solution made from the powder is ingested by the pet. At least a portion of the lactose in the pet milk powder is hydrolyzed upon reconstitution of the powder with a solvent. Also, a pet milk-based drink made by reconstituting the powder with a solvent such as water.

17 Claims, No Drawings

MILK-BASED POWDER FOR PETS

CROSS-REFERENCE TO RELATED APPLICATIONS

This application is a continuation-in-part of U.S. application Ser. No. 09/801,264 filed Mar. 7, 2001, now U.S. Pat. No. 6,471,999 which is a continuation of the U.S. national phase designation of International Application PCT/EP99/06621, filed Sep. 7, 1999. This application also claims the benefit of U.S. provisional application No. 60/099,383 filed Sep. 8, 1998.

FIELD OF INVENTION

The present invention relates to a milk-based powder for pets. Particularly, the present invention is directed to a pet milk composition that may be reconstituted to provide a milk-based nutritional composition for pets, especially for young pets.

BACKGROUND OF RELATED ART

Many pet owner's, especially owners of young pets, feed cow's milk or cow's milk based compositions to their pets since cow's milk is an excellent source of nutrition. Further, in cases where very young pets are unable to obtain milk from their mothers, cow's milk or compositions based upon cow's milk may be the only source of nutrition for the young animal.

Unfortunately, the feeding of cow's milk to pet mammals may result in gastrointestinal intolerance. This manifests itself in a variety of intestinal symptoms which include bloating, distension, cramps, flatulence, lower fecal consistency and, in severe cases, diarrhea. Lower fecal consistency and diarrhea are particularly well known symptoms. (Mundt, H. C. and Meyer, H.; 1989, Waltham Symposium 7: Nutrition of the Dog and Cat, Cambridge University Press, pages 267–274). The cause of the gastrointestinal intolerance is attributed to the lactose in cow's milk.

Removal of lactose from cow's milk for human applications is well known. This is usually done by micro- or ultra-filtration or enzymatic treatment, or both, of liquid milk or whey solutions. Further milk or whey powders which are low in lactose, or lactose-free, are commercially available and may be fed to pets, but these powders are generally too expensive for commercial use in pet products. For pets, a possible solution to the problem is described in EP 0259713, where the lactose in the composition is reduced by reducing the content of milk powder in the composition to below about 60% by weight. In order to make up for the reduction in protein, lactose-reduced or lactose-free milk proteins are then added to the composition. In this way, the lactose content of the composition may be reduced to below about 30% by weight, but this requires the addition of large amounts of lactose-reduced or lactose-free milk proteins which increases the cost.

Mundt and Meyer, supra, suggest that another solution to this problem is to hydrolyze the lactose using enzymes prior to producing the pet milk powder. This is an acceptable solution when milk is freely and inexpensively available in liquid form, but it is not a feasible solution when the milk ingredient is available in powdered form; which is commonly the case.

Thus, there remains a need for a cow's milk-based powder which may be reconstituted to provide a milk-based nutritional composition, which is relatively simple to prepare and relatively inexpensive.

SUMMARY OF THE INVENTION

In one aspect, this invention provides a pet milk powder comprising a cow's milk powder which contains lactose, and a lactase. It has been surprisingly found that the simple addition of lactase to milk powder is able to avoid or significantly reduce the gastrointestinal problems associated with the consumption of lactose. This is despite the fact that the milk composition produced by reconstituting the milk powder may be consumed immediately after reconstitution; that is before the lactose has had the time to degrade the lactose in the milk powder. Preferably, at least a portion of the lactose in pet milk powder will become hydrolyzed upon reconstitution with solvent. Accordingly, upon reconstituting the pet powder product as a drink, and before its ingestion by the pet, the composition will comprise hydrolyzed and unhydrolyzed lactose. Preferably, 5 to 80% of the lactose is hydrolyzed upon reconstitution with a solvent.

Preferably, the lactase is a β-galactosidase, and more preferably, the β-galactosidase is from micro-organism origin. A β-galactosidase that is active at an acidic pH is particularly preferred.

The milk powder may further comprise one or more of a lipid source, protein source, vitamins, and minerals.

In another aspect of the invention, the milk powder is formulated for cats, the powder comprising a cow's milk powder which contains lactose, a lactase, taurine, arginine and choline. In yet another aspect of the invention, the milk powder is formulated for dogs, the powder comprising a cow's milk powder which contains lactose, lactase, and choline.

In a further aspect, the invention provides a method for reducing the symptoms of gastrointestinal intolerance in a mammalian pet after consumption of a nutritional composition based on cow's milk, the method comprising administering to the pet an effective amount of lactase in combination with the nutritional composition.

DETAILED DESCRIPTION OF THE PREFERRED EMBODIMENTS

Preferred embodiments of the invention are now described by way of example only.

The invention concerns a milk-based powder which may be reconstituted with water or other solvent to provide a nutritional drink for pets comprising hydrolyzed and unhydrolyzed lactose before ingestion.

The milk-based powder contains cow's milk powder and a lactase. The cow's milk powder may be any suitable milk powder which is based upon cow's milk; for example skimmed milk powder and whole milk powder. Further, milk powders produced from standardized milk-based solutions may be used. If desired, the cow's milk powder may contain additives such as vitamins, minerals, protein, lipids, and the like. The lactose content of the milk powder is not critical to the invention. Of course, if cow's milk powders having low lactose contents are readily and inexpensively available, they may be advantageously used.

The lactase may be any suitable lactase which is generally recognized as safe. β-galactosidases are preferred; especially β-galactosidases of microbial origin. Since conditions in the gastrointestinal tract are acidic, a lactase which remains active under acidic conditions is preferred. It is also possible to use lactases which are active under neutral or basic conditions. In these cases, however, it may be useful to include an alkali in the milk-based powder which slows the pH drop in the gastrointestinal tract.

An enzyme which is particularly suitable is a β-galactosidase which may be obtained from Amano Enzyme USA Co Ltd of Lombard, Ill., USA. The enzyme is available under the name "Lactase Amano". The enzyme is obtained from Aspergillus oryzae and has an optimum pH of about 4.8 when lactose is the substrate. The enzyme has an activity of more than 50000 units/g at optimum pH. The enzyme is generally recognized as safe and is food grade.

The amount of the lactase to be added will depend upon various factors such as the lactose content of the cow's milk powder and the activity of the enzyme. The useful amount may be readily determined by a skilled person. Ordinarily, the lactase may be added to provide about 25 UI100 g to about 200 UI/100 g powder; for example about 50 UI/100 g to about 125 UI/100 g powder. The unit, UI, indicates the amount of enzyme which produces 1 micromole of o-Nitrophenol per minute at 30 degree. C. when 3.0 ml of a solution which contains 200 mg of -Nitrophenol-.βgalactopyranoside per 100 ml of 0.1 M McIlvaine buffer, pH 4.5; is added to 1.0 ml of diluted enzyme solution. The reaction is stopped after 10 minutes.

For an enzyme which has an activity of about 50 UI/100 g to about 125 UI/100 g powder, the lactase may comprise about 0.05% to about 0.4% by weight of the milk-based powder; and preferable from about 0.15% to about 0.25% by weight.

If it is desired to make the milk-based powder more nutritionally complete, other nutritional components may be added to the powder. For example, a lipid source may be added to the milk-based powder. Any suitable lipid source may be used; for example vegetable oils such as soybean oil, sunflower oil, safflower oil, corn oil, peanut oil, and rapeseed oil, or animal fats such as milk fats and tallow. In general, the lipid source used will be selected on the basis of nutritional value, cost and palatability considerations.

It is also possible to add further protein and amino acids sources. For example, whey protein powders may be added to the milk-based powder. Similarly, the milk-based powder may be supplemented with free amino acids which are required by the mammal for complete nutrition. For example, for milk-based powder intended for kittens, the powder may be supplemented with taurine or arginine, or both.

The milk-based powder may also contain vitamins and minerals. It is particularly preferred to include a source of calcium; for example dicalcium phosphate.

The milk-based powder may also include a probiotic micro-organism. A probiotic micro-organism is a micro-organism which beneficially affects a host by improving its intestinal microbial balance (Fuller, R; 1989; J. Applied Bacteriology, 66: 365–378). In general, probiotic micro-organisms produce organic acids such as lactic acid and acetic acid which inhibit the growth of pathogenic bacteria. Examples of suitable probiotic micro-organisms include yeasts such as Saccharomyces, Debaromyces, Candida, Pichia and Torulopsis, molds such as Aspergillus, Rhizopus, Mucor, and Penicillium and Torulopsis and bacteria such as the genera Bifidobacterium, Bacteroides, Clostridium, Fusobacterium, Melissococcus, Propionibacterium, Streptococcus, Enterococcus, Lactococcus, Staphylococcus, Peptostrepococcus, Bacillus, Pediococcus, Micrococcus, Leuconostoc, Weissella, Aerococcus, Oenococcus and Lactobacillus. Specific examples of suitable probiotic micro-organisms are: *Saccharomyces cereviseae, Bacillus coagulans, Bacillus licheniformis, Bacillus subtilis, Bifidobacterium bifidum, Bifidobacterium infantis, Bifidobacterium longum, Enterococcus faecium, Enterococcus faecalis, Lactobacillus acidophilus, Lactobacillus alimentarius, Lactobacillus casei* subsp. *casei, Lactobacillus casei Shirota, Lactobacillus curvatus, Lactobacillus delbruckii* subsp. *lactis, Lactobacillus farciminus, Lactobacillus gasseri, Lactobacillus helveticus, Lactobacillus johnsonii, Lactobacillus reuteri, Lactobacillus rhamnosus (Lactobacillus GG), Lactobacillus sake, Lactococcus lactis, Micrococcus varians, Pediococcus acidilactici, Pediococcus pentosaceus, Pediococcus acidilactici, Pediococcus halophilus, Streptococcus faecalis, Streptococcus thermophilus, Staphylococcus carnosus,* and *Staphylococcus xylosus.* The probiotic micro-organisms are preferably in powdered, dried form; especially in spore form for micro-organisms which form spores. Further, if desired, the probiotic micro-organism may be encapsulated to further increase the probability of survival; for example in a sugar matrix, fat matrix or polysaccharide matrix.

Further, the milk-based powder may also include a source of a fermentable soluble fiber, for example, chicory fibers, inulin, fructooligosaccharides, and the like. Preferably the fermentable soluble fibre selected is a substrate for the probiotic micro-organism selected, or such that the fermentable soluble fibre and probiotic micro-organism form a symbiotic relationship for promoting beneficial effects.

It is of course possible that vitamins, minerals, amino acids and a lipid source may have been used in the preparation of the cow's milk powder. In this case, less or none of these ingredients need be added.

The milk-based powder may be manufactured by dry mixing the cow's milk powder, the lactase, and any other ingredients. If a lipid source is added, it is preferably mixed in last. Any suitable mixing apparatus may be used. The milk-based powder is then packed into suitable packages.

The amount of the nutritional composition to be fed to a mammal each day will depend upon factors such as the mammal's age, the type of mammal, and other sources of nutrition. In general, the nutritional composition may be used in much the same way and in the same amounts as milk is used. For example, for medium and large dogs, up to about 250 ml of the nutritional composition per day may be fed to the dog. For smaller dogs, up to about 125 ml of the nutritional composition per day may be fed to the dog. Similar values may be readily determined for cats and other mammals.

EXAMPLES

By way of illustration, specific examples of the invention are now described.

Example 1

A milk-based powder for dogs is prepared by dry mixing together whole milk powder, β-galactosidase ("Lactase Amano"), vitamins, minerals and soybean oil. The composition of the powder is as follows:

1 Ingredient Percent by Weight Milk powder 96.2 Soybean oil 1.7 Dicalcium phosphate 1.1 Choline 0.4 β-galactosidase 0.2 Vitamins, Minerals 0.4 The milk-based powder has a lactose content of about 33% by weight. The milk powder is added to tap water and is rapidly reconstituted to provide a milk-based nutritional composition. The nutritional composition is highly palatable to puppies and dogs.

Example 2

A milk-based powder for cats is prepared by dry mixing together whole milk powder, β-galactosidase, arginine, taurine, vitamins, minerals and soybean oil. The composition of the powder is as follows:

2 Ingredient Percent by Weight Milk powder 97.1 Dicalcium phosphate 1.5 Choline 0.4 Arginine 0.4 .β.-galactosidase 0.2 Soybean oil 0.05 Vitamins, Minerals 0.35 The milk-based powder has a lactose content of about 33% by weight. The milk powder is added to tap water and is rapidly reconstituted to provide a milk-based nutritional composition. The nutritional composition is highly palatable to kittens and cats.

Example 3

Seven beagle dogs 5 to 12 years are used in a trial. Each dog is separately housed in a cage. The dogs have access to a dry diet ad libitum.

In the first part of the trial, the dogs are fed a milk reconstituted from a full fat milk powder for a period of 7 days. The milk contains vitamins and minerals. The milk is reconstituted immediately before serving by adding cold tap water to the fill fat milk powder. Food consumption, liquid consumption and faecal consistency are monitored. In the second part of the trial, the dogs are fed a nutrition composition reconstituted from the milk-based powder of example 1 for a period of 7 days. The nutrition composition is reconstituted immediately before serving by adding cold tap water to the milk-based powder. Food consumption, liquid consumption and faecal consistency are monitored. In both parts of the trial, each dog is fed 900 g per day of the milk or nutritional composition. The milk or nutritional composition is available from 9 a.m. to 3 p.m. and is the only liquid source during this period. In general, the entire amount of liquid is consumed rapidly. From 3 p.m. to 9 a.m., the dogs have free access to water.

3 Percentage of stool having Percentage of stools being Food loose stool consistency diarrhoeic Milk 36 19 nutritional 12 7 composition of example 1.

The nutritional composition offers a significant improvement even at this high level of consumption.

Example 4

Seven cats aged 5 to 12 years are used in a trial. Each cat is separately housed in a cage. The cats have access to a fish-based dry diet ad libitum.

In the first part of the trial, the cats are fed a milk reconstituted from a full fat milk powder for a period of 7 days. The milk contains vitamins and minerals. The milk is reconstituted immediately before serving by adding cold tap water to the full fat milk powder. Food consumption, liquid consumption and faecal consistency are monitored. In the second part of the trial, the cats are fed a nutrition composition reconstituted from the milk-based powder of example 2 for a period of 7 days. The nutrition composition is reconstituted immediately before serving by adding cold tap water to the milk-based powder. Food consumption, liquid consumption and faecal consistency are monitored.

In both parts of the trial, each cat is presented with 180 g per day of the milk or nutritional composition. The milk or nutritional composition is available from 3:00 p.m. to 9 a.m. and is the only liquid source during this period. From 9 a.m. to 3 p.m., the cats have free access to water.

4 Percentage of stool having Percentage of stools being Food loose stool consistency diarrhoeic Milk 42 37 nutritional 20 0 composition of example 2.

The nutritional composition offers a very significant improvement. No significant change in consumption between the milk and nutritional composition is noticed. Hence palatability is unaffected by the addition of the enzyme.

Example 5

A milk-based powder is prepared using a .β.-galactosidase enzyme obtained from Novo Nordisk A/S of Bagsvaerd, Denmark and sold under the name Lactozym. The powder is substantially identical to the powder of example 1 except that this different enzyme is used. The enzyme is optimally active under basic conditions. When fed to beagle dogs, the milk-based powder has substantially the same properties as the powder of example 1.

What is claimed is:

1. A pet milk powder comprising a cow's milk powder which contains lactose, and lactase in an amount sufficient to reduce the symptoms of gastrointestinal intolerance in pets when the powder or a solution made from the powder is ingested by the pet, wherein at least a portion of the lactose in the pet milk powder is hydrolyzed upon reconstitution of the powder with a solvent.

2. The pet milk powder of claim 1 wherein the lactase is a β-galactosidase.

3. The pet milk powder of claim 2 wherein the β-galactosidase is of microbial origin.

4. The pet milk powder of claim 1 wherein the lactase is present in an amount of between 0.05 to 0.4% by weight of the powder.

5. The pet milk powder of claim 1 wherein the lactase provides about 75 UI/100 g to about 125 UI/100 g of powder.

6. The pet milk powder of claim 1 further comprising at least one of a lipid source, a protein source, one or more vitamins or one or more minerals.

7. The pet milk powder of claim 1 further comprising a calcium source.

8. The pet milk powder of claim 1 and specifically formulated for cats, the powder containing taurine and choline.

9. The pet milk powder of claim 1 and specifically formulated for dogs, the powder containing choline.

10. A milk-based drink formulated for pets, said drink comprising the pet milk powder of claim 1 which is reconstituted with a solvent.

11. The pet drink of claim 10 wherein the solvent is water.

12. The pet drink of claim 10 wherein 5% to 80% of the lactose in the pet milk powder is hydrolyzed upon reconstitution.

13. The pet drink of claim 10 specifically formulated for cats and containing taurine and choline.

14. The pet drink of claim 10 specifically formulated for dogs and containing choline.

15. A drink formulated for pets comprising a cow's milk powder which contains lactase providing about 75 UI/100 g to about 125 UI/100 g of powder, wherein the drink comprises hydrolyzed and unhydrolyzed lactose.

16. The pet drink of claim 15, wherein the lactase is a β-galactosidase and further comprising at least one of more of a lipid source, a protein source, one or more vitamins or one or more minerals, a calcium source, taurine or choline.

17. A pet food composition comprising the pet milk powder of claim 1.

* * * * *

UNITED STATES PATENT AND TRADEMARK OFFICE
CERTIFICATE OF CORRECTION

PATENT NO.   : 6,551,633 B2
DATED        : April 22, 2003
INVENTOR(S)  : Couzy et al.

It is certified that error appears in the above-identified patent and that said Letters Patent is hereby corrected as shown below:

Title page,
Item [75], Inventors, change "Christine Leuba" to -- Christiane Leuba --.
Item [56], References Cited, OTHER PUBLICATIONS, change "K-State Veterinarian helps owners separate" to -- K-State Veterinarian helps pet owners separate --; and change "http://classes.aces,uiuc.edu," to
-- http://classes.aces.uiuc.edu, --.

Column 6,
Line 61, change "at least one of more" to -- at least one or more --.

Signed and Sealed this

Twelfth Day of August, 2003

JAMES E. ROGAN
*Director of the United States Patent and Trademark Office*